(12) United States Patent (10) Patent No.: US 12,689,527 B2
Perlman et al. (45) Date of Patent: Jul. 21, 2026

(54) LIMITING POWER OF UNTRUSTED CERTIFICATE AUTHORITIES

(71) Applicant: Dell Products L.P., Round Rock, TX (US)

(72) Inventors: Radia J. Perlman, Redmond, WA (US); Charles W. Kaufman, Redmond, WA (US)

(73) Assignee: Dell Products L.P., Round Rock, TX (US)

( * ) Notice: Subject to any disclaimer, the term of this patent is extended or adjusted under 35 U.S.C. 154(b) by 179 days.

(21) Appl. No.: 18/401,716

(22) Filed: Jan. 2, 2024

(65) Prior Publication Data

US 2025/0219850 A1 Jul. 3, 2025

(51) Int. Cl.
*H04L 9/32* (2006.01)
(52) U.S. Cl.
CPC .................................. *H04L 9/3268* (2013.01)

(58) Field of Classification Search
None
See application file for complete search history.

(56) References Cited

U.S. PATENT DOCUMENTS

| | | | |
|---|---|---|---|
| 9,380,053 B1 * | 6/2016 | Behnken | ............. H04L 63/0823 |
| 2016/0277193 A1 * | 9/2016 | Sabin | ...................... H04L 9/321 |
| 2017/0118029 A1 * | 4/2017 | Salmi | ...................... H04L 9/321 |
| 2024/0146543 A1 * | 5/2024 | Sahoo | ................... H04L 9/0894 |
| 2025/0132930 A1 * | 4/2025 | Hawkins | ................... H04L 9/30 |

* cited by examiner

*Primary Examiner* — Benjamin E Lanier
(74) *Attorney, Agent, or Firm* — Workman Nydegger

(57) ABSTRACT

Limiting power of untrusted certificate authorities is disclosed. An unstructured list of certificate authorities associated with an application may be augmented with a limiting database that includes a per target certificate authority list. For targets identified in the limiting database, the certificate of an entity may be trusted only when the certificate authority is in the target's list, even if the certificate authority is present in the unstructured list of certificate authorities.

20 Claims, 4 Drawing Sheets

400

Memory
402

NVRAM
404

Processor
406

Application(s)
414

Storage Media
408

UI Device
410

Data Storage
412

LIMITING POWER OF UNTRUSTED CERTIFICATE AUTHORITIES

FIELD OF THE INVENTION

Embodiments of the present invention generally relate to certificate verification. More particularly, at least some embodiments of the invention relate to systems, hardware, software, computer-readable media, and methods for enhancing certificate verification in networks and network communications.

BACKGROUND

Communications that occur over networks, including the Internet, often rely on digital certificates and public key infrastructure (PKI). A digital certificate may be used to verify the identity of the entity to which the digital certificate was issued. A digital certificate includes a public key that is associated with an entity identified in the digital certificate. The digital certificate may also include other information about the entity such as name, organization, and other details. This information should be verified by the certificate authority (CA) that issues the digital certificate.

The digital certificate is signed using a private key of the certificate authority. This creates a strong binding between the public key and identity of the entity represented in the digital certificate. When communicating over a network, a digital certificate allows the communicating entities to verify the identity of the other entity. More specifically, when an entity wants to verify the identity of another entity, the public key of the certificate authority is used to verify the signature on the digital certificate. This process, when verified, ensures that the certificate was issued by the certificate authority. Once the digital certificate is verified, the public key included in the digital certificate can be used for communications with the now verified entity identified in the digital certificate.

More specifically, the current model for certificate verification on the Internet (e.g., when using HTTPS (Hypertext Transfer Protocol Secure)) is that a browser is configured (usually by a vendor of the browser software, e.g., Microsoft or Google, or by someone authorized to configure the browser, e.g., a corporate IT department) with public keys of hundreds of certificate authorities. The browser will, as a result, trust any certificate presented by a website claiming a name (e.g., Example.com) if that certificate is signed by any one of those hundreds of certificate authorities or if the chain provided by the site chains back to one of those certificate authorities.

Unfortunately, this suggests that a single untrustworthy certificate authority among the hundreds of existing certificate authorities can impersonate just about any entity on the Internet. More specifically, browsers are typically configured to trust hundreds of certificate authorities. It is typically unwise to trust large numbers of organizations because it is likely that an attacker will be able to find some employee in one of organizations that can be tricked or bribed into issuing a certificate with any name and any key. Once an attacker has a certificate signed by a rogue certificate authority for a DNS (Domain Name System) name (e.g., Example-.com) and a public key for which the attacker has the private key, that certificate will be believed by any browser and the attacker can impersonate that specific entity, or Example-.com in this example.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to digital certificates and authentication or verification operations. More particularly, at least some embodiments of the invention relate to systems, hardware, software, computer-readable media, and methods for enhancing certificate based communications.

Embodiments of the invention may be discussed in the context of browsers and the Internet. However, embodiments of the invention apply to digital certificates generally and other usage scenarios including signed code, signed mail transfer agents (MTAs), and the like. Embodiments of the invention are also discussed in the context of HTTPS and TLS (Transport Layer Security), but may be employed with other protocols and communications. Embodiments of the invention are also discussed in the context of browsers and Internet communications, but may be implemented in other applications and networks and protocols.

Figure 1:
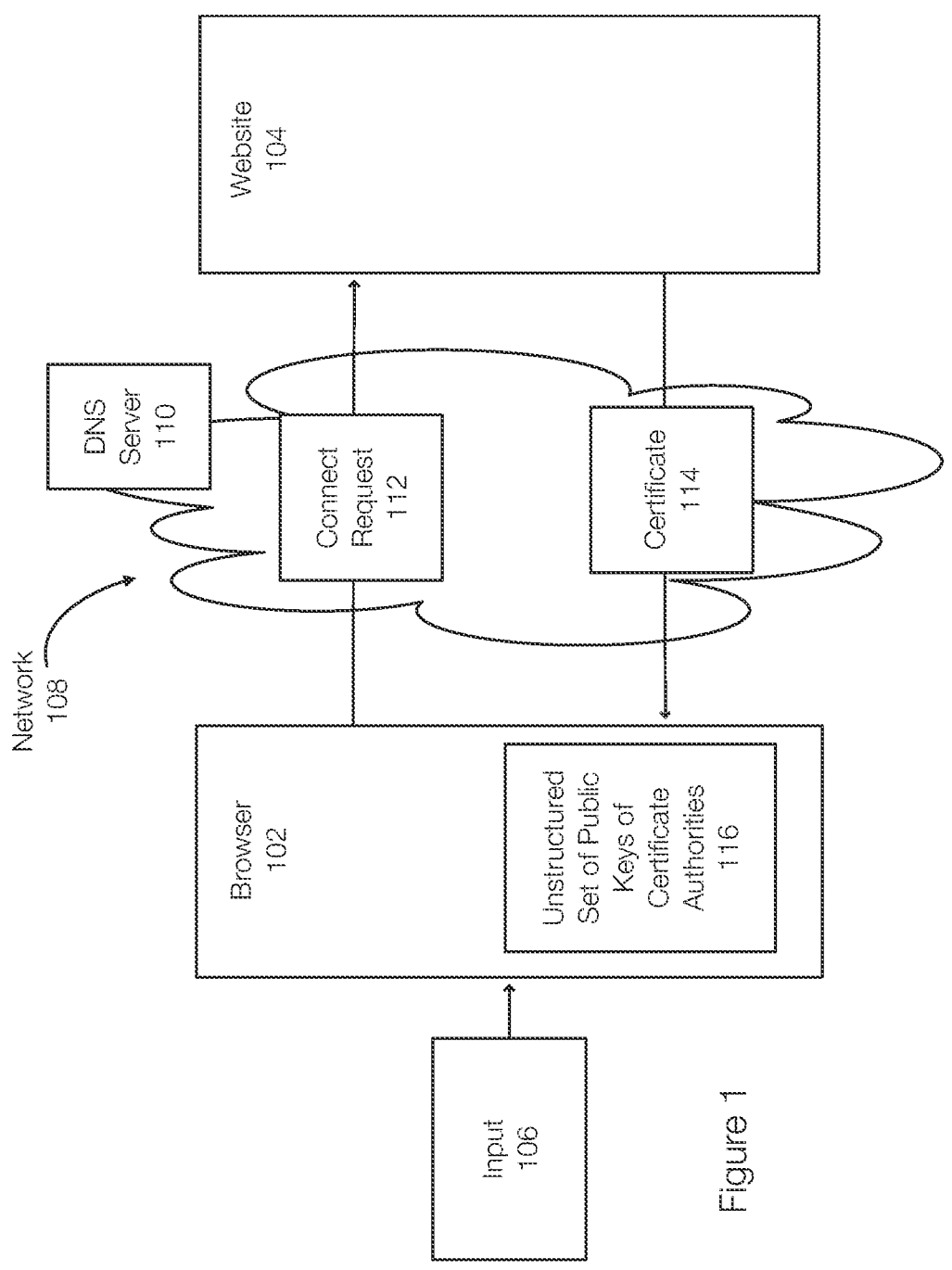
FIG. 1 discloses aspects of accessing a website using certificate verification.

FIG. 1 discloses aspects of certificate based communications. This example includes communications that use HTTPS and/or TLS based communications. In this example, a browser 102, which may be operating on a computing device (e.g., a computer, laptop, tablet, smartphone) may receive input 106. The input 106 may be an instruction to connect with a website 104.

The browser 102, in response to the input 106 may look up the website 104 in a DNS server 110, which may translate the human readable name of the website 104 to a numerical value (e.g., the Internet Protocol (IP) address). The browser 102 then sends a connect request 112 to the website 104. Because the connect request 112 is occurring over HTTPS and TLS in this example, the website 104 returns a digital certificate 114 to the browser 102.

The certificate 114 is signed by a certificate authority and the certificate 114 essentially states that the website 104 has a particular public key and purports to be a specific entity. The browser 102 may be configured with an unstructured set 116 of public keys of certificate authorities (e.g., hundreds of keys). If the digital certificate 114 is signed by one of the certificate authorities represented in the set 116, the browser 102 will believe that the certificate 114 is valid. Thus, communication may proceed between the browser 102 and the website 104, even if the website is malicious or if the certificate authority was not valid or was malicious.

In some examples, a certificate authority may be trusted for some websites and untrusted for other websites. For example, a particular certificate authority may be sufficiently trustworthy to create certificates for a website that allows online game playing but not for a financial institution. In another example, a country specific (e.g., Elbonia) certificate authority may be trusted for websites owned in Elbonia. However, an entity in Elbonia may be motivated to create problems in another country and may influence one the Elbonia specific certificate authorities to issue malicious certificates for sites in that other country. As a result, an entity or browser may not want to trust certificates created by the Elbonia specific certificate authority for any site outside of Elbonia.

Embodiments of the invention relate to certificate verification systems and methods to limit the power or impact of untrusted certificate authorities. In one embodiment, a limiting database is generated. The limiting database may be organized by website name (or other reference or key). Each website name is associated with a list of certificates authorities that should be trusted for that website in the limiting database.

For example, a browser may issue a connect request to a website such as example.com. The limiting database may identify that certificate authorities A and B should be trusted for the website example.com. Thus, if the response to the connect request includes a certificate signed by a certificate authority Z, which is not included in the list of trusted certificate authorities for the website example.com in the limiting database, the browser should not trust that certificate signed by the certificate authority Z even if the certificate authority Z is in the default database of certificate authorities.

This limiting database does not need to list or contain all websites. For websites not included in the limiting database, the default database of certificate authorities may be used. Further, the manner in which a certificate is not trusted can vary. For example, if a certificate is deemed untrusted based on the limiting database, the browser may refuse to create a connection. Alternatively, the browser may accept/create the connection, but provide a warning to the user.

The limiting database or list-by-website can be configured into the browser in a manner similar to the manner in which the default database of certificate authorities is configured into the browser. For example, the limiting database may be downloaded or retrieved from a place or site configured to be trusted by the browser. An entity's IT department may configure the limiting database into all entity-owned devices or configure the entity-owned devices to reach an IP address of the trusted entity from which the limiting database may be downloaded or retrieved.

The limiting database can reduce the chances of a rogue or untrusted certificate authority creating a malicious certificate for a website that is included in the limiting database because the limiting database may only identify a few carefully selected certificate authorities compared to the large number of certificate authorities in the unstructured default list or database of certificate authorities.

Figure 2:
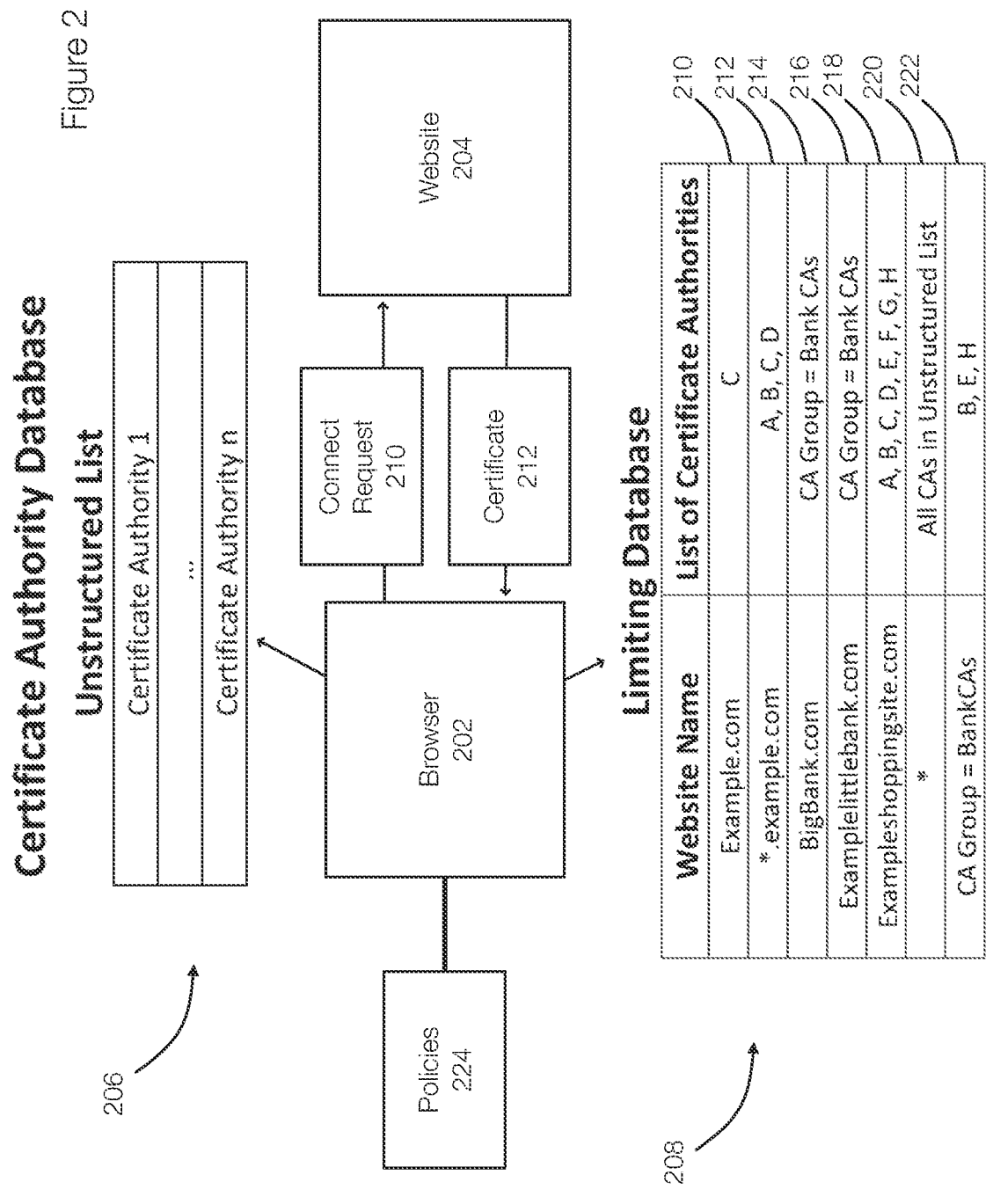
FIG. 2 discloses aspects of accessing a website using certificate verification while limiting the power of untrusted certificate authorities.

FIG. 2 discloses additional aspects of limiting power of untrusted certificate authorities. Similar to FIG. 1, FIG. 2 illustrates a browser 202, which may be operating on a device, that is configured to access targets such as a website 204. The process is similar to FIG. 1. However, the browser 202 may be configured with or have access to a certificate authority database 206 and a limiting database 208.

The certificate authority database 206 may be an unstructured list of certificate authorities (represented as certificate authorities 1 . . . n). Using only the certificate authority database 206, the browser 202 will accept any certificate signed by any of the certificate authorities 1 . . . n.

In this example, the browser 202 also includes a limiting database 208. Generally, the limiting database 208 may associate targets with acceptable certificate authorities. More specifically, the certificate authorities in the limiting database 208 may be authorized (e.g., by corporate or other entity) and the targets may be website names. The specific representation of data in the limiting database 208 may vary (e.g., text, numbers). The limiting database 208, by way of example, associates a website name with a list of acceptable certificate authorities. The entry 210 associated a website name of "Example.com" with a certificate authority C. The entry 212 associates the website name of "*.example.com" with certificate authorities A, B, C, and D. Thus, the list of certificate authorities acceptable for "Example.com" is different from the list of certificate authorities that are acceptable for all websites under the umbrella of "Example.com", as represented by the wildcard "*". The wildcard "*" applies to all names that match the wildcard name.

In one example, the limiting database 208 accepts groups. Thus, the entry 214 illustrates that the acceptable certificate authorities for the website "BigBank.com" are those in the group BankCAs. The limiting database 208 then defines the certificate authorities included in the group BankCAs as the certificate authorities B, E, and H in the entry 222. The entry 216 for a website name of examplelittlebank.com is similarly configured with a group name. The use of group names may allow space to be conserved in the limiting database 208. The entry 218 for exampleshoppingsite.com lists acceptable certificate authorities.

The entry 220 should not occur in the limiting database and should be omitted in one embodiment. Rather, any website name that does not appear in the limiting website may cause the browser 202 to default to the unstructured list of the certificate authority database 206. The action taken by the browser may depend on policy.

The use of wildcards may result in situations where a website name may match multiple entries in the limiting database 208. Embodiments of the invention may include rules to resolve these types of scenarios. For example, the best match may be selected. More complex rules can be applied to establish precedence. Alternatively, multiple matches may result in a warning to a user, cause the browser to disconnect, or the like.

The databases 206 and 208 may be used during normal browsing sessions. When a connect request 210 is made to the website 204, a certificate 212 may be included in the response from the website 204 to the connect request 210. In this example, the limiting database 208 is consulted first. If the website 204 is in the limiting database 208, embodiments of the invention determine whether the certificate authority that signed the certificate 212 is present in the limiting database 208 for the website 204. If the certificate authority for the website 204 is present in the limiting database 208, the certificate 212 is trusted and may be used.

The operations or actions performed by the browser 202 when the website 204 is not present in the limiting database 208 may depend on a policies 224 The policies 224 may cause the certificate verification operation to default to the certificate authority database or unstructured list 206 and trust any certificate authority found in the unstructured list 206 when the website 204 is not present in the limiting database 208. Alternatively, the policies 224 may require the browser 202 to disconnect and not communicate with the website 204.

In another example, a certificate authority may be found in the limiting database 208 and not found in the unstructured list 206. The policies 224 may determine whether the certificate 212 should be trusted in this example. One policy in this scenario is to allow the limiting database 208 to supersede the unstructured list 206. Alternatively, the limiting database 208 may be another set of trusted certificates for certain websites or website names.

When a certificate is received from a website and the website name is present in the limiting database 208, the policies may require that the certificate authority that issued the certificate be present in both the limiting database 208 and the unstructured list 206. If the certificate authority in this example is not present in both the limiting database 208 and the unstructured list 206, the certificate may not be trusted. With this policy, even if someone manages to trick the browser 202 into downloading or configuring a bogus or malicious per-website-list (limiting database) of certificate authorities, the bogus or malicious copy, in one example, would not prevent the browser 202 from reaching some websites, but would prevent the browser 202 from accessing a website that is impersonating a website name in the bogus or malicious limiting database. In this scenario, the unstructured list 206 would operate normally.

The limiting database 208, also referred to as a per-website-certificate authority list, can be configured in the browser 202. Alternatively, the unstructured list 206 may be reconfigured using the limiting database 208 such that the browser 202 is, in effect, associated only with a single database or list. This may result in changes to the organization or structure of the unstructured list 206.

The browser 202 may be configured to access a site or URL from which the limiting database 208 may be downloaded (e.g., an IP address on a corporate network). In another example, the browser 202 may be configured with a single trusted key and the limited database 208 can be downloaded from insecure, easily available sites as long as the limiting database is signed by the corresponding public key.

Embodiments of the invention allow a limiting database to be maintained by an entity that the client machine (or owner thereof) trusts, such as a corporate IT department or other entity selected by the user or owner.

Figure 3:
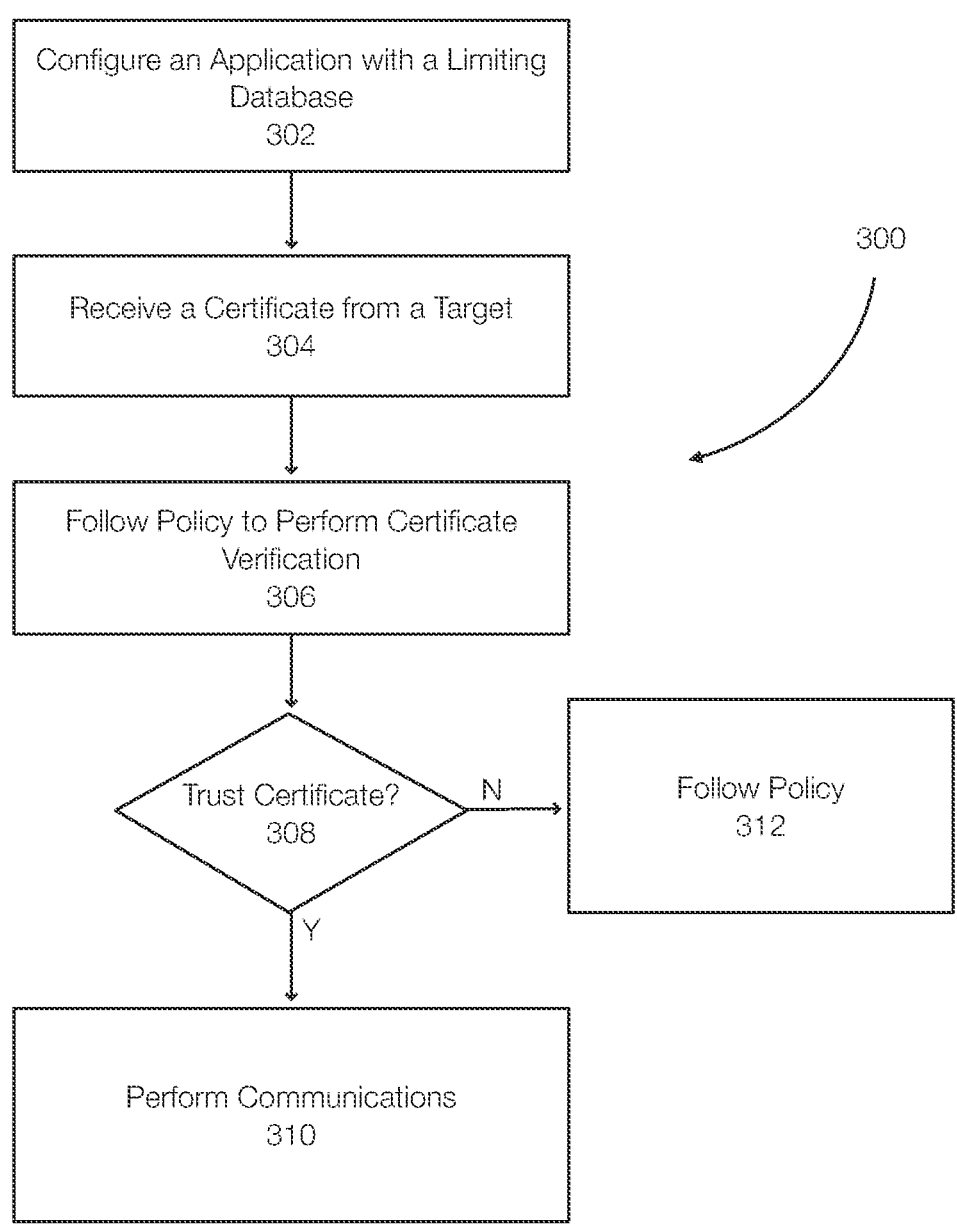
FIG. 3 discloses aspects of a method for accessing websites using certificate verification while limiting the power of untrusted certificate authorities.

FIG. 3 discloses aspects of a method for limiting untrusted certificate authorities. Aspects of the method 300 may include different portions that may be performed independently or less frequently. For example, a provisioning stage of the method 300 may include configuring an application (e.g., a browser) with a limiting database. The remainder of the method 300 may be an operational stage. However, configuring the application 302 may occur periodically or as needed as the limited database may need to be updated or changed.

In the operational phase, an application (or client) may receive 304 a certificate from a target such as a website. The certificate is signed by a certificate authority and the application may perform 306 certificate verification according to policy, examples of which were previously described. For example, the application may determine whether the limiting database has an entry for the target. If so, then the application may determine whether the certificate authority that signed the certificate is present in the limiting database for that specific target. The method 300 the determines whether to trust the certificate.

If the certificate is trusted (Y at 308) communications or other actions are performed 310. If the certificate is not trusted (N at 308), then policy is followed 312. This may include terminating the connection, providing a warning to a user, or the like.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, browsing operations, certificate related operations, certificate verification operations, network communication operations, or the like. More generally, the scope of the invention embraces any operating environment in which the disclosed concepts may be useful.

New and/or modified data collected and/or generated in connection with some embodiments, may be stored in a data storage environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to perform operations initiated by one or more clients or other elements of the operating environment.

Example cloud computing environments, which may or may not be public, include storage environments that may provide data storage functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating data. As such, a particular client may employ, or otherwise be associated with, one or more instances of each of one or more applications that perform such operations with respect to data. Such clients May comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines, containers, or virtual machines (VM), though no particular component implementation is required for any embodiment.

As used herein, the term 'data' is intended to be broad in scope. Example embodiments of the invention are applicable to any system capable of storing and handling various types of objects, in analog, digital, or other form.

It is noted that any operation(s) of any of these methods disclosed herein, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A method comprising: receiving, at an application, a certificate from a target that has been signed by a certificate authority, wherein the application is associated with a list of certificate authorities and a limiting database that associates targets with specific certificate authorities, performing certificate verification according to a policy, wherein the policy includes: determining whether the target is included in the limiting database, determining whether the certificate authority that signed the certificate is associated with the target in the limiting database when the target is included in the limiting database, and communicating with the target when the certificate is verified using the limiting database.

Embodiment 2. The method of embodiment 1, further comprising performing the certificate verification for signed code, signed email or mail servers using the limiting database.

Embodiment 3. The method of embodiment 1 and/or 2, wherein the application is a browser and the target is a website.

Embodiment 4, The method of embodiment 1, 2, and/or 3, wherein the targets comprise website names and wherein the limiting database associates website names with authorized certificate authorities.

Embodiment 5, The method of embodiment 1, 2, 3, and/or 4, further comprising defaulting to the list of certificate authorities to perform certificate verification when the target is not present in the limiting database.

Embodiment 6, The method of embodiment 1, 2, 3, 4, and/or 5, wherein the limiting database supersedes the list of certificate authorities when performing the certificate verification.

Embodiment 7, The method of embodiment 1, 2, 3, 4, 5, and/or 6, wherein certificate authorities present in the limiting database and not present in the list of certificate authorities are not added to the list of certificate authorities.

Embodiment 8, The method of embodiment 1, 2, 3, 4, 5, 6, and/or 7, further comprising retrieving the limiting database from a specified location.

Embodiment 9, The method of embodiment 1, 2, 3, 4, 5, 6, 7, and/or 8, further comprising disconnecting from the target when the target is included in the limiting database and the certificate authority is not present in the limiting database.

Embodiment 10, The method of embodiment 1, 2, 3, 4, 5, 6, 7, 8, and/or 9, wherein the limiting database comprises a per website certificate authority list.

Embodiment 11 A system, comprising hardware and/or software, operable to perform any of the operations, methods, or processes, or any portion of any of these, disclosed herein.

Embodiment 12 A non-transitory storage medium having stored therein instructions that are executable by one or more hardware processors to perform operations comprising the operations of any one or more of embodiments 1-10.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, client, agent, service, engine, or the like may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
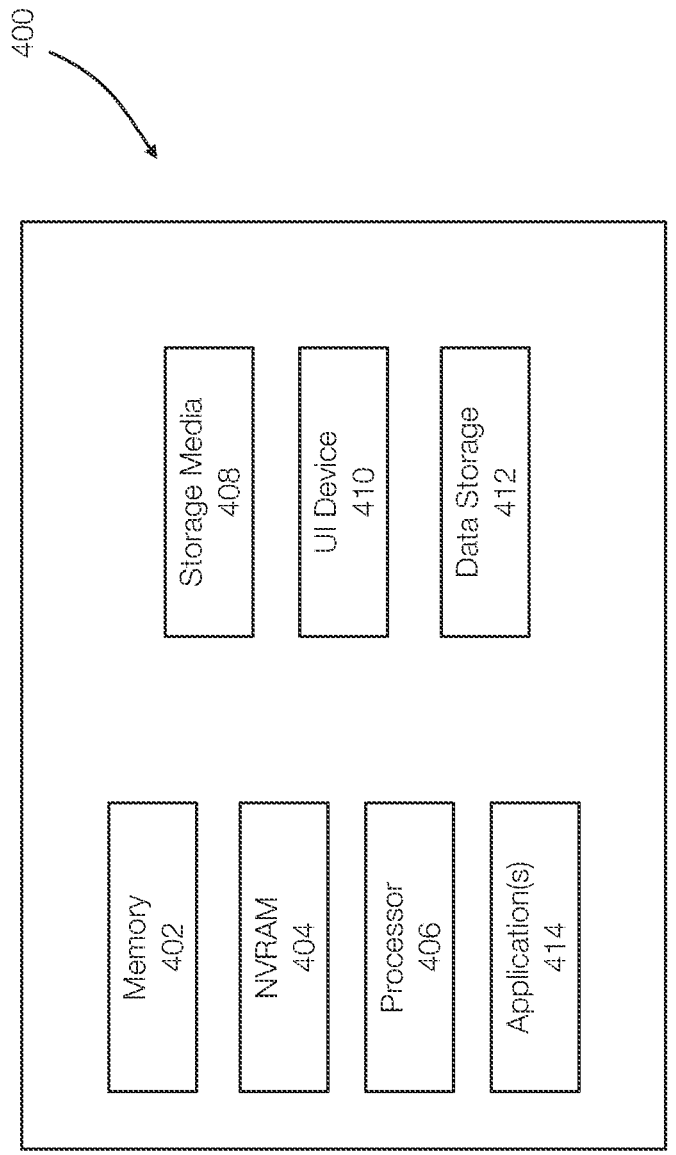
FIG. 4 discloses aspects of a computing device, system, or entity.

With reference briefly now to FIG. 4, any one or more of the entities disclosed, or implied, by the Figures and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 402.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

receiving, at an application, a certificate from a target that has been signed by a certificate authority, wherein the application is associated with a list of certificate authorities and a limiting database that defines, by policy, authoritative designations identifying, for each target, one or more certificate authorities that are permitted to issue certificates for the target, the limiting database being provisioned to the application as client-side policy by an entity trusted by the application and being independent of control by the target, the limiting database defining, for targets included therein, a subset of the list of certificate authorities that are authorized for the respective target, the limiting database being enforced to override or restrict trust decisions made using the list of certificate authorities;

performing certificate verification according to a policy, wherein the policy includes:

determining whether the target is included in the limiting database;

determining whether the certificate authority that signed the certificate is identified in the limiting database as a certificate authority permitted to issue certificates for the target when the target is included in the limiting database; and when the target is included in the limiting database, determining trust based solely on the limiting database without consulting authorization data published by the target, terminating or refusing communication with the target when the certificate authority that signed the certificate is not identified as permitted for the target in the limiting database, even if the certificate authority is present in the list of certificate authorities, and communicating with the target only when the certificate is verified using the limiting database.

2. The method of claim 1, further comprising performing the certificate verification for signed code, signed email or mail servers using the limiting database.

3. The method of claim 1, wherein the application is a browser and the target is a website.

4. The method of claim 1, wherein the targets comprise website names and wherein the limiting database associates website names with authorized certificate authorities.

5. The method of claim 1, further comprising defaulting to the list of certificate authorities to perform certificate verification when the target is not present in the limiting database.

6. The method of claim 1, wherein the limiting database supersedes the list of certificate authorities when performing the certificate verification.

7. The method of claim 1, wherein certificate authorities present in the limiting database and not present in the list of certificate authorities are not added to the list of certificate authorities.

8. The method of claim 1, further comprising retrieving the limiting database from a specified location.

9. The method of claim 1, further comprising disconnecting from the target when the target is included in the limiting database and the certificate authority is not present in the limiting database.

10. The method of claim 1, wherein the limiting database comprises a per website certificate authority list.

US 12,689,527 B2

11

11. A non-transitory storage medium having stored therein instructions that are executable by one or more hardware processors to perform operations comprising:

receiving, at an application, a certificate from a target that has been signed by a certificate authority, wherein the application is associated with a list of certificate authorities and a limiting database that defines, by policy, authoritative designations identifying, for each target, one or more certificate authorities that are permitted to issue certificates for the target, the limiting database being provisioned to the application as client-side policy by an entity trusted by the application and being independent of control by the target, the limiting database defining, for targets included therein, a subset of the list of certificate authorities that are authorized for the respective target, the limiting database being enforced to override or restrict trust decisions made using the list of certificate authorities;

performing certificate verification according to a policy, wherein the policy includes:

determining whether the target is included in the limiting database; and determining whether the certificate authority that signed the certificate is identified in the limiting database as a certificate authority permitted to issue certificates for the target when the target is included in the limiting database; and when the target is included in the limiting database, determining trust based solely on the limiting database without consulting authorization data published by the target, terminating or refusing communication with the target when the certificate authority that signed the certificate is not identified as permitted for the target in the limiting database, even if the certificate authority is present in the list of certificate authorities, and communicating with the target only when the certificate is verified using the limiting database.

12. The non-transitory storage medium of claim 11, further comprising performing the certificate verification for signed code, signed email or mail servers using the limiting database.

13. The non-transitory storage medium of claim 11, wherein the application is a browser and the target is a website.

14. The non-transitory storage medium of claim 11, wherein the targets comprise website names and wherein the limiting database associates website names with authorized certificate authorities.

15. The non-transitory storage medium of claim 11, further comprising defaulting to the list of certificate authorities to perform certificate verification when the target is not present in the limiting database.

16. The non-transitory storage medium of claim 11, wherein the limiting database supersedes the list of certificate authorities when performing the certificate verification.

17. The non-transitory storage medium of claim 11, wherein certificate authorities present in the limiting database and not present in the list of certificate authorities are not added to the list of certificate authorities.

18. The non-transitory storage medium of claim 11, further comprising retrieving the limiting database from a specified location.

19. The non-transitory storage medium of claim 11, further comprising disconnecting from the target when the target is included in the limiting database and the certificate authority is not present in the limiting database.

20. The non-transitory storage medium of claim 11, wherein the limiting database comprises a per website certificate authority list.

* * * * *